INVENTORS
George P. Beck and
Harold N. Brauch.

United States Patent Office 3,452,311
Patented June 24, 1969

3,452,311
INTERLEAVED WINDING HAVING A TAPPED SECTION AND SWITCH
George P. Beck, Sharon, and Harold N. Brauch, Farrell, Pa., assignors to Westinghouse Electric Corporation, Pittsburgh, Pa., a corporation of Pennsylvania
Filed Jan. 18, 1968, Ser. No. 698,881
Int. Cl. H01f 15/14, 29/02, 21/02
U.S. Cl. 336—70                     4 Claims

ABSTRACT OF THE DISCLOSURE

A winding having a plurality of stacked coils which are each formed from at least two interleaved conductors. The coils are connected to provide at least one series path between the winding ends. The winding has at least one tap section connected through a switch which enables the tapped section to be connected in series aiding or series opposing relationship with respect to the remaining portion of the winding without changing its series capacitance.

Background of the invention

*Field of the invention.*—This invention relates in general to electrical inductive apparatus, such as transformers, and more particularly to transformers of the core-form type, having tapped windings of the high series capacitance, interleaved turn type.

*Description of the prior art.*—Electrical transformers of the core-form type commonly have a high voltage winding constructed of a plurality of pancake coils, which are arranged into a stack and disposed about a winding leg of a suitable magnetic core. Voltage surges applied to this type winding, such as caused by lightning or switching, are distributed across the winding in a very nonlinear manner, concentrating at the line end thereof. This is undesirable, as the highly stressed insulation at the line end of the winding, between the conductor turns, between adjacent pancake coils, and from the pancake coils to ground, may fail, and thus cause the transformer to fail. Surge potentials should be distributed as uniformly as possible across an electrical winding, not only to reduce the stress concentrations at the line end of the winding, but also to reduce the magnitude of transient voltage oscillations produced when the voltage distribution changes from capacitive to inductive, following a surge potential.

An indication of how uniformly a surge voltage will be distributed across a winding may be obtained from its distribution constant α, which is the ratio of the square root of the ground capacitance $C_g$ of the winding, to its series capacitance $C_s$.

$$\alpha = \sqrt{\frac{C_g}{C_s}}$$

The smaller the distribution constant, the more uniformly a surge voltage will be distributed across the winding. Thus, in an effort to reduce the distribution constant α, the windings are constructed to have as high a series or through capacitance as practical. In the prior art, high series capacitance windings are commonly constructed by a method called interleaving, which disposes turns from an electrically distant portion of the winding between electrically connected turns. For a specific application, the interleaving arrangement, the degree of interleaving, and the insulation between turns and between pancakes, is carefully selected. In some windings, the degree of interleaving is changed in zones across the winding, along with a grading of the insulation between turns, to achieve a uniform voltage stress across the winding.

Disposing taps on these high series capacitance windings, and adding or shorting out sections of the winding with tap changer means upsets the design of the winding from the viewpoint of achieving the desired distributed series capacitance across the winding. Since the capacitive structure of a tapped winding may change according to the position of the tap changer, the ideal voltage distribution and the desired uniform stresses between conductor turns, and between pancake coils, will not be achieved. The designer must then compromise the design, which adds to its cost and complexity.

Summary of the invention

Briefly, the invention is a new and improved high series capacitance winding for electrical transformers which includes one or more tap sections connected to the remaining portion of the winding through switching or tap changer means. Each tap section is connected in series with the main portion of the winding, with the switching means having positions for connecting the tap section in series aiding, or series opposing. When more than one tap section is included in the winding, they may each have a different number of turns, in order to create additional voltage steps by connecting them in different combinations of series aiding and series opposing. Thus, the effective number of turns in the winding may be changed without physically removing or adding any turns to the circuit. The capacitive structure of the winding thus remains the same, regardless of how the tap sections are connected, and the turn-to-turn and coil-to-coil stresses will be maintained at the design values over the tap range.

Brief description of the drawings

Further advantages and uses of the invention will become more apparent when considered in view of the following detailed description and drawings, in which.

Description of preferred embodiments

Figure 1:
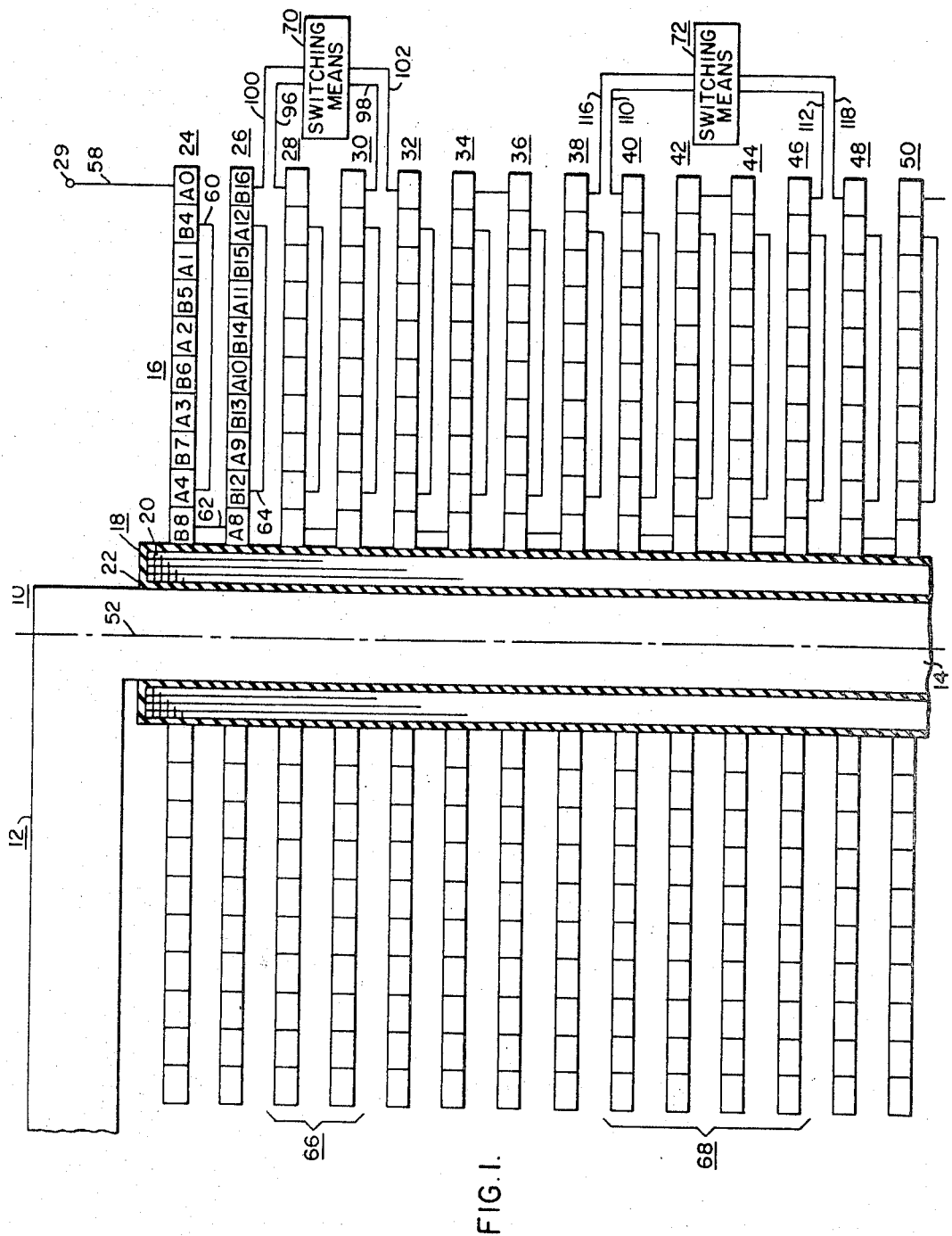
FIGURE 1 is a partial sectional elevation of a transformer having an electrical winding constructed according to the teachings of the invention.
Figure 2:
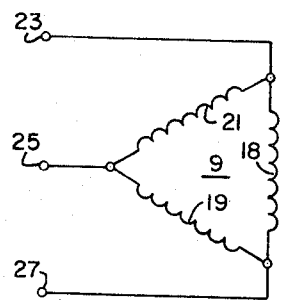
FIG. 2 is a schematic diagram of the transformer shown in FIG. 1.

Referring now to the drawings, and FIGS. 1 and 2 in particular, there is shown a transformer 10 of the core-form type, which is schematically illustrated in FIG. 2 as being three-phase, but which may be single-phase, if desired. Transformer 10, as shown in FIG. 2, includes a delta connected low voltage winding 9 having phase sections 18, 19 and 21 connected to terminals 23, 25 and 27, and a Y connected high voltage winding 7 having phase sections 16, 35 and 37, connected to terminals 29, 31 and 33, respectively. The terminals of windings 7 and 9 are adapted for connection to either a source of alternating potential, or a load circuit, depending upon whether transformer 10 is used in a step-up, or a step-down application. Since the invention may be adequately illustrated by a portion of a single-phase winding assembly, only the phase which includes low voltage phase winding section 18 and high voltage phase winding section 16 is shown in the elevational view of transformer 10 in FIG. 1.

More specifically, transformer 10 includes a magnetic core 12 which may be of conventional construction, having a winding leg 14 about which high and low voltage phase winding sections 16 and 18 are concentrically disposed. Low voltage winding 18 may also be of conventional construction, having a plurality of electrically insulated conductor turns 20, which are insulated from magnetic core 12 and high voltage winding assembly 16 by insulating means 22.

High voltage phase winding assembly 16 comprises a plurality of pancake or disc type coils 24, 26, 28, 30, 32, 34, 36, 38, 40, 42, 44, 46, 48 and 50, which are spaced axially apart in a stacked arrangement about the axis 52 of magnetic core leg 14. Only a sufficient number of pancake coils, and turns per pancake coil, are illustrated which are necessary to adequately describe the invention. It is to be understood that phase winding 16 may have any number of pancake coils, and turns per pancake coil, depending upon the specific application.

The plurality of pancake coils, such as pancake coil 16, are each constructed and connected to increase their series capacitance, and thus the series capacitance of the winding structure 16. The series capacitance of the pancake coils is increased by disposing turns from an electrically distant portion of the coil, or winding, between electrically connected turns. This method of increasing series capacitance, called interleaving, may be accomplished by any one of several different arrangements. United States Patents 3,090,022, 3,260,978, 3,278,879, and 3,299,385 all disclose suitable interleaving arrangements which may be used. For purposes of example, the interleaving arrangement disclosed in United States Patent 3,090,022, called single interleaving, is illustrated in FIG. 1. In general, in the single interleaving arrangement, each pancake coil is wound with first and second electrical conductors to provide first and second interleaved coil sections each having a plurality of conductor turns which are radially interleaved with one another. The interleaving of each pancake coil is performed by connecting the inner end of one coil section to the outer end of the other coil section. The interleaved pancake coils are connected in series with one another, to complete the winding structure. The pancake coils may be connected start-start, finish-finish; or, finish-start. The "start" of a coil is the inner end of one of its coil sections, and the "finish" is the outer end of one of its coil sections, regardless of where the winding circuit first enters the pancake coil.

More specifically, FIG. 1 illustrates the pancake coils of winding 16 singly interleaved and start-start, finish-finish connected. The first pancake coil 24 includes first and second coil sections I and II, best shown in the schematic diagram of FIG. 2, with the circuit first entering the outer end of coil section I from the line terminal 29 via conductor 58, and spiraling inwardly via every other turn, appearing at turns A1, A2, A3 and A4. These conductor turns are given the letter A to denote the first excursion of the circuit through the coil, and a number to indicate its electrical position in the winding. At the inner end of coil section I, the circuit proceeds via interleaving connection 60 to the outer end of coil section II, with this end being referenced B4 to indicate the start of the second excursion of the circuit through pancake coil 24, and to indicate that it is electrically at substantially the same potential as the end of turn A4. The circuit again spirals inwardly through pancake coil 24, appearing at every other turn B5, B6, B7 and B8. This completes pancake coil 24, and the end of turn B8 is connected to the inner end of one of the coil sections of pancake coil 26, such as coil section II, via start-start connection 62. The inner end of coil section II is referenced A8, to indicate the first excursion of the circuit through pancake coil 26, and to indicate that it is electrically at substantially the same potential as the end of turn B8 in pancake coil 24. The circuit spirals outwardly through pancake coil 26, appearing at every other turn A9, A10, A11 and A12, and the outer end of coil section II is connected to the inner end of coil section I of pancake coil 26, via interleaved connection 64. The inner end of coil section I is referenced B12 to indicate the second excursion through pancake coil 26, and to indicate that it is at substantially the same potential as the end of turn A12 in section II of pancake coil 26. The circuit again spirals outwardly through pancake coil 26, appearing at every other turn B13, B14, B15 and B16. This completes pancake coil 26. The remaining pairs of pancake coils are all connected in a manner similar to pancake coils 24 and 26. Since the circuit spirals inwardly in one of the pancake coils of a pair and outwardly in the other of the pancake coils of a pair, the turns in the two pancake coils of each pair should spiral in opposite circumferential directions, in order to each provide a magnetomotive force in the magnetic circuit which is in the same direction.

In order to vary the effective number of turns in winding 16, and thus vary the turn ratio of transformer 10, as required by the specific location of the transformer in an electrical power system, or in response to load conditions on the transformer, winding 16 contains tap sections 66 and 68. Winding 16 has two tap sections, by way of example, but it will be understood that it may have any desired number. However, for purposes which will be hereinafter explained, each tap section preferably should include a different predetermined number of turns. Thus, in the embodiment of the invention shown in FIG. 1, tap section 66 includes pancake coils 28 and 30, and tap section 68 includes pancake coils 40, 42, 44 and 46.

Each tap section in winding 16 is connected in series circuit relation with the remaining portion of winding 16, through suitable switching or tap changer means which has positions to either connect each tap section in series aiding, or series opposing, with respect to the remainder of the winding. Thus, tap section 66 may be connected to the immediately adjacent pancake coils 26 and 32 through switching means 70, and tap section 68 may be connected to its immediately adjacent pancake coils 38 and 48, through switching means 72. The switching or tap changer means for switching the series connections of the tap sections 66 and 68 within the winding assembly 16 are illustrated as being two separate switches 70 and 72, but the switching functions may be accomplished by a single multideck switching means, in a manner well known in the art.

While the invention is applicable to high series capacitance interleaved type windings which have only one tap section, which would then provide two different output voltages, any number of tap sections may be used, and as hereinbefore stated, the maximum number of voltage steps are obtainable if each tap section is selected to have a different number of turns. In the embodiment of the invention shown in FIG. 1, tap section 68 has twice as many turns as tap section 66. For purposes of example, it will be assumed that transformer 10 is a step-up transformer, and that when both tap sections 66 and 68 are connected series aiding, the voltage output will be 100%, with tap section 66 contributing 2½% of the output voltage, and tap section 68 contributing 5%. This specific connection of the tap sections 66 and 68 is shown schematically in FIG. 2.

Switching means 70 and 72 each have six stationary contacts, and two movable contacts. Switching means 70 has stationary contacts 74, 76, 78, 80, 82 and 84, and movable contacts 104 and 106. Switching means 72 has stationary contacts 86, 88, 90, 93 and 94, and movable contacts 120 and 122.

Contacts 76 and 78 of switching means 70 are connected together, and to pancake coil 28 via conductor 96, and contacts 82 and 84 are connected together, and to pancake coil 30 via conductor 98. Contact 74 is connected to pancake coil 26 via conductor 100, and contact 80 is connected to pancake coil 32 via conductor 102. Movable contacts 104 and 106 are electrically insulated from one another, but may be driven by a common shaft 108. Movable contacts 104 and 106 are illustrated in FIG. 2 bridging contacts 74 and 76, and 80 and 82, respectively, which connects tap section 66 in series with the winding 16 such that the voltage across its turns adds to the voltage of the adjacent sections of the winding.

In like manner, contacts 88 and 90 of switching means 72 are connected together, and to pancake coil 40 of tap section 68 via conductor 110, and contacts 93 and 94 are connected together, and to pancake coil 46 via conductor 112. Contact 86 is connected to pancake coil 38 via conductor 116, and contact 92 is connected to pancake coil 48 via conductor 118. Movable contacts 120 and 122 are electrically insulated from one another, but may be driven by a common drive shaft 124. Movable contacts 120 and 122 are illustrated in FIG. 2 bridging contacts 86 and 88, and 92 and 93, respectively, which connects tap section 68 in series with winding 16 such that the voltage across its turns adds to the voltage of the adjacent sections of the winding. Thus, the voltage across winding 16 will be 92½% for the main sections of the winding, plus 2½% for tap section 66, plus 5% for tap section 68, for a total of 100%.

Figure 3:
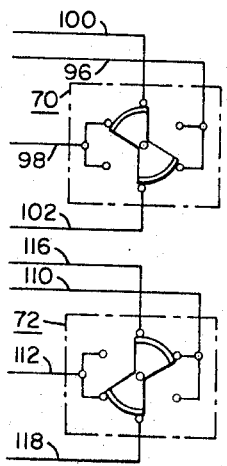
FIGS. 3, 4 and 5 are schematic diagrams which illustrate various positions of the switching means for effecting tap changes in the electrical winding shown in FIGS. 1 and 2.

The first lower voltage step may be obtained by changing switching means 70 to bridge contacts 74 and 84, and contacts 78 and 80, which connects tap section 66 such that its voltage opposes the voltage of the main portion of the winding. Switching means 72 maintains its previous position. This embodiment of the invention is shown schematically in FIG. 3, with winding 16, in this instance, providing a voltage equal to 92½%, minus 2½%, plus 5% for total of 95%.

Figure 4:
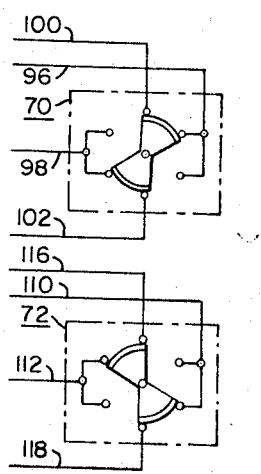

The next lower voltage step may be obtained by returning switching means 70 to its position shown in FIG. 2, which connects tap section 66 in a series aiding relationship, and by moving contacts 120 and 122 to bridge stationary contacts 86 and 94, and 90 and 92, respectively, which connects tap section 68 in series opposition with the remainder of the winding. This embodiment of the invention is shown in FIG. 4, with winding 16, in this instance, providing a voltage equal to 92½%, plus 2½%, minus 5%, for a total of 90%. It should be noted that if tap sections 66 and 68 each had the same number of turns, that this last described voltage step would not be obtainable, as the winding would have the same output voltage for the tap changer positions shown in both FIGS. 3 and 4.

Figure 5:
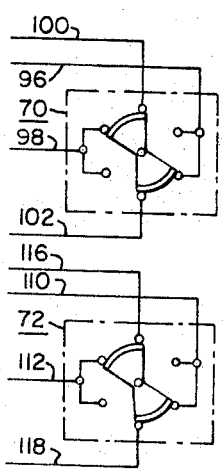

The next voltage step may be obtained by connecting both switching means 70 and 72 in series opposition with respect to the remainder of the winding 16, as shown in the schematic diagram of FIG. 5. In this position, the output voltage of winding 16 will be 92½%, minus 2½%, minus 5%, for a total of 85%.

Thus, using only two tap sections having a different number of turns, four different output voltage levels may be obtained from winding 16 without removing the tap sections from the winding structure. Thus, the different voltage levels are achieved without changing the series capacitance of the winding. This simplifies and optimizes the design of transformer 10, since surge potentials will be distributed in substantially the same manner across the winding, regardless of whether the tap sections are connected in series aiding, series opposing, or a combination of series aiding and series opposing.

If the transformer 10 is a step-down transformer, instead of a step-up, the basic operation of the apparatus will be substantially the same, since the effective turn ratio of the transformer will be changed, which changes the volts per turn and thus the output voltage of the low voltage winding.

Since numerous changes may be made in the above described apparatus and different embodiments of the invention may be made without departing from the spirit thereof, it is intended that all matter contained in the foregoing description or shown in the accompanying drawings, shall be interpreted as illustrative, and not in a limiting sense.

We claim as our invention:

1. A winding for electrical inductive apparatus comprising:

a plurality of pancake coils arranged in a stack to provide a winding structure having first and second ends, each of said pancake coils having at least two coil sections formed by electrical conductors wound together to provide a plurality of radially interleaved conductor turns, said coil sections being interconnected to dispose conductor turns from an electrically distant portion of the winding between electrically connected conductor turns, to increase the series capacitance of the winding, and to provide at least one series path between the ends of the winding, switching means, said winding structure having at least one tap section connected through said switching means into said at least one series path between the ends of the winding, said switching means having first and second positions which connects said tap section in series aiding, and series opposing, respectively, with respect to the remaining portion of the winding, changing the effective number of turns in the winding without changing its series capacitance.

2. The winding of claim 1 wherein said winding structure has at least first and second tap sections connected into said at least one series path through said switching means.

3. The winding of claim 2 wherein said first and second tap sections each have a different number of turns.

4. The winding of claim 3 wherein said switching means has at least four positions, with one position connecting both tap sections in series aiding, one position connecting both tap sections in series opposing, one position connecting said first and second tap sections in series aiding and series opposing respectively, and one position connecting said first and second tap sections in series opposing and series aiding, respectively.

References Cited

UNITED STATES PATENTS

| 1,818,589 | 8/1931 | Thornton et al. | 336—143 |
| 3,113,281 | 12/1963 | Ayers | 336—150 |

FOREIGN PATENTS

| 1,011,375 | 11/1965 | Great Britain. |

LEWIS H. MYERS, *Primary Examiner.*

T. J. KOZMA, *Assistant Examiner.*

U.S. Cl. X.R.

336—143, 146